United States Defensive Publication [19] (H) [11] T101,702

Barton et al. [43] Apr. 6, 1982

[54] TEXTILE SIZING COMPOSITIONS

[76] Inventors: Kenneth R. Barton, 201 Claymore Dr., Kingsport, Tenn. 37663; Richard L. McConnell, 421 Manderley Rd., Kingsport, Tenn. 37660

[21] Appl. No.: 258,155

[22] Filed: Apr. 27, 1981

Related U.S. Application Data

[63] Continuation of Ser. No. 136,148, Mar. 31, 1980, abandoned.

[51] Int. Cl.[3] ..... C08F 110/02; D06M 15/26

[52] U.S. Cl. ..... 526/352; 28/178; 428/375

[57] ABSTRACT

Disclosed are hot-melt polyethylene compositions which are particularly useful as sizing compositions for textile materials. The compositions have a melt viscosity of from about 150 cp at 125° C. to about 6000 cp at 190° C. and may be removed from textile substrates using conventional petroleum based solvents. Useful polyethylenes include those having viscosities of from about 100 cp at 125° C. to about 40,000 cp at 190° C., densities of from about 0.90 to about 0.97 and melting points of from about 95° C. to about 135° C.

11 Claims, No Sheets Drawing,

13 Pages Specification

The file of this unexamined application may be inspected and copies thereof may be purchased (849 O.G. 1221, Apr. 9, 1968).